United States Patent
Ding

(10) Patent No.: US 9,914,162 B2
(45) Date of Patent: Mar. 13, 2018

(54) ASSEMBLY AND METHOD FOR PRESS FORMING A DEFORMABLE MATERIAL

(71) Applicant: THE UNIVERSITY OF QUEENSLAND, St. Lucia, Queensland (AU)

(72) Inventor: Shichao Ding, Kuraby (AU)

(73) Assignee: THE UNIVERSITY OF QUEENSLAND, Queensland (AU)

( * ) Notice: Subject to any disclaimer, the term of this patent is extended or adjusted under 35 U.S.C. 154(b) by 0 days.

(21) Appl. No.: 15/169,513

(22) Filed: May 31, 2016

(65) Prior Publication Data

US 2016/0271673 A1    Sep. 22, 2016

Related U.S. Application Data

(60) Division of application No. 12/628,505, filed on Dec. 1, 2009, now Pat. No. 9,352,373, which is a (Continued)

(30) Foreign Application Priority Data

Jun. 1, 2007   (AU) ................................ 2007902961
Dec. 3, 2008   (AU) ................................ 2008906262

(51) Int. Cl.
   *B21D 13/02*     (2006.01)
   *B21D 13/08*     (2006.01)
   *B21D 5/06*      (2006.01)
   *B21D 13/10*     (2006.01)
   *B23P 15/24*     (2006.01)
   *B21D 5/08*      (2006.01)

(52) U.S. Cl.
   CPC ............... *B21D 13/02* (2013.01); *B21D 5/06* (2013.01); *B21D 13/08* (2013.01); *B21D 13/10* (2013.01); *B23P 15/24* (2013.01); *B21D 5/08* (2013.01)

(58) Field of Classification Search
   CPC ........ B21D 37/02; B21D 37/21; B21D 13/10; B21D 13/08; B21D 13/00; B21D 5/06;
   (Continued)

(56) References Cited

U.S. PATENT DOCUMENTS

1,431,175 A   10/1922   Ogden et al.
3,474,657 A * 10/1969   Spiegel ................ B21D 5/0209
                                                72/478
(Continued)

FOREIGN PATENT DOCUMENTS

CN   1297810     6/2001
JP   56-119632   9/1981

*Primary Examiner* — R. K. Arundale
*Assistant Examiner* — Mohammad Yusuf
(74) *Attorney, Agent, or Firm* — Nixon Peabody LLP; Jeffrey L. Costellia

(57) ABSTRACT

An assembly for press forming a deformable material including: a first die array including a plurality of dies, the first die array defining a first die profile; a second die array that is complementary with the first die array and including a plurality of dies, the second die array defining a second die profile that is complementary with the first die profile; and a drive for driving at least one of the first die array and the second die array; wherein in use the plurality of dies of the first die array and the plurality of dies of the second die array sequentially engage the deformable material along a processing length to deform the deformable material to a predetermined profile.

11 Claims, 10 Drawing Sheets

Related U.S. Application Data continuation-in-part of application No. PCT/AU2008/000769, filed on May 30, 2008.

(58) Field of Classification Search
CPC .................. B21D 13/02; G05B 19/188; G05B 2219/35044; B23P 15/24
USPC ................................... 76/107.1; 72/413, 446
See application file for complete search history.

(56) References Cited

U.S. PATENT DOCUMENTS

| | | | |
|---|---|---|---|
| 3,641,803 A | 2/1972 | Schuurbiers et al. | |
| 3,889,513 A * | 6/1975 | Iwasaki | B21D 37/02 72/383 |
| 4,212,188 A * | 7/1980 | Pinson | B21D 5/01 72/413 |
| 4,509,357 A * | 4/1985 | Zbornik | B21D 5/0209 72/384 |
| 5,490,407 A | 2/1996 | Doose | |
| 5,546,784 A * | 8/1996 | Haas | B21D 37/02 72/413 |
| 6,053,026 A * | 4/2000 | Nardiello | B21D 37/02 72/297 |
| 6,209,380 B1 * | 4/2001 | Papazian | B21D 37/02 72/413 |
| 6,502,447 B2 | 1/2003 | Adams et al. | |
| 6,834,525 B2 | 12/2004 | Leon et al. | |
| 7,324,868 B2 * | 1/2008 | Yamazaki | G05B 19/188 700/117 |

* cited by examiner

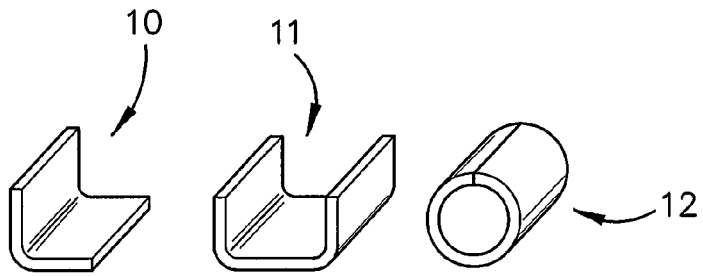
FIGURE 1
PRIOR ART
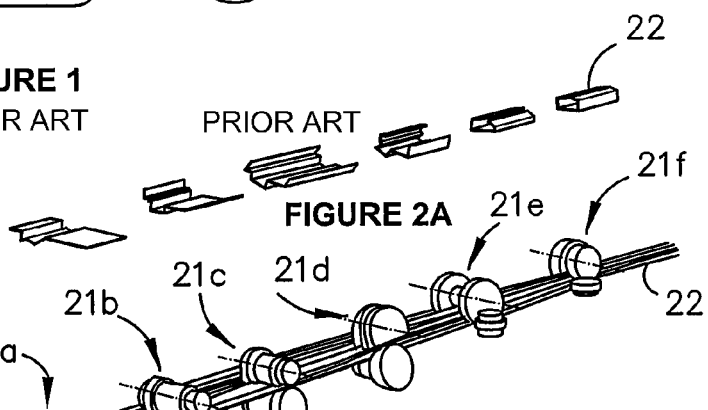
PRIOR ART
FIGURE 2A
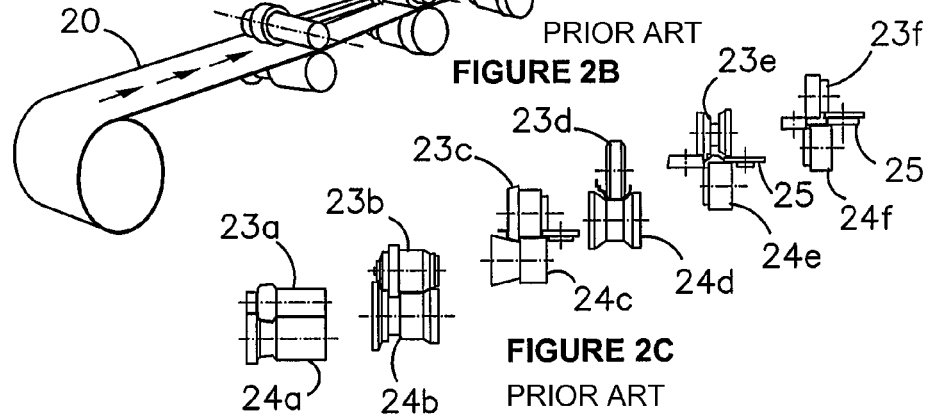
PRIOR ART
FIGURE 2B
FIGURE 2C
PRIOR ART
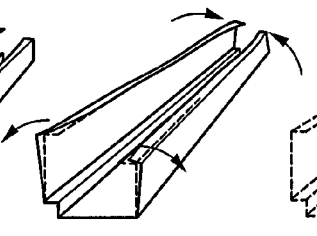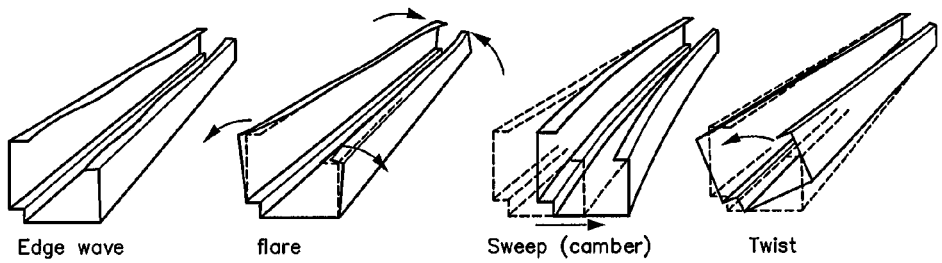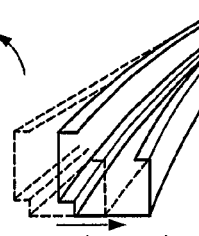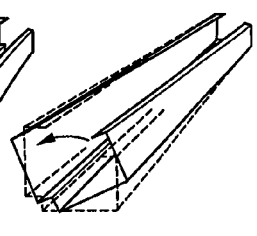
Edge wave | flare | Sweep (camber) | Twist
FIGURE 3A | FIGURE 3B | FIGURE 3C | FIGURE 3D
PRIOR ART | PRIOR ART | PRIOR ART | PRIOR ART

ASSEMBLY AND METHOD FOR PRESS FORMING A DEFORMABLE MATERIAL

FIELD OF THE INVENTION

The present invention relates to an assembly for press forming a deformable material and a method that may employ such an assembly. More particularly, the invention provides an assembly for press forming a deformable material that includes so opposing pair of die arrays, each die array having a complementary profile determined by a desired final configuration of the formed material. The method, which may advantageously make use of the assembly of the invention, typically ensures that the deformable material is gradually deformed to provide the desired final configuration. More particularly, the method generally aims to deliver pressure to the deformable material along a processing length of the material such that the material is continuously deformed through the processing length. In alternative aspects, the invention relates to an assembly for press forming a deformable material that includes a single die array and a complementary second die, which does not necessarily take the form of a die array. Methods employing such an assembly are also provided. Still further, the invention relates to a die set for use in an assembly for press forming a deformable material and a method of fabricating such a die set.

BACKGROUND TO THE INVENTION

Systems and assemblies for forming a deformable material, such as a sheet of metal, into a desired profile are known. One such system, known as roll forming, is a well established process used in many industries, such as automotive and construction industries, to produce simple and complex shapes from a sheet of metal. Examples of some profiles 10, 11 and 12 produced by roll forming are provided in FIG. 1.

With reference to FIGS. 2A through 2C, roll forming includes passing a continuous sheet 20 through a series of spaced roll sets 21a through 21f. Each roll set 21 progressively deforms the sheet 20 to the desired final profile 22. Each roll set 21 includes at least one upper roll 23a through 23f, and at least one lower roll 24a through 24f. In some instants, side rolls 25 may also be provided, depending on the desired final profile 22.

As mentioned above, the rolls 23, 24 and 25 are designed such that tie sheet of material 20 is progressively deformed to the final profile 22. In order to achieve this deformation, the roll sets 21 must be spaced at predetermined distances to facilitate sufficient deformation and relaxation between the roll sets 21. This disadvantageously results in wasted deformation energy. Also, the roll forming process inherently involves strain path differences doe to unnecessary axial bending and stretching between each roll set 21. Axial plastic bending and stretching lead to product defects as shown in FIGS. 3A through 3D. These defects include so-called edge wave (FIG. 3A), flare (FIG. 3B), sweep or camber (FIG. 3C) and twist (FIG. 3D). Roll forming also has disadvantages in that the surface of the sheet of material being formed is placed under stresses due to stretching of the material. In the case of a coated metal for example, this may have deleterious effects on the quality of the surface finish.

Roll forming has another disadvantage in that the distance between the first roll set 21 a and the last roll set, in this case 21f, is relatively large. As a result, the space needed to house a roll forming assembly is substantial, particularly when forming of complex profiles is required. Moreover, a specific set up of roll sets 21 is required for each desired final profile 22. Consequently it is not a simple process to set up a roll forming assembly, nor is it possible to simply exchange roll sets 21 to produce a different final profile 22.

Alternatives to traditional roll forming assemblies, as described above, have been proposed, for example in German Offenlegungsschrift No. 2 423 279 and European Patent No. 0 384 287.

German Offenlegungsschrift No. 2 423 279 describes a press forming assembly that includes an upper die and a lower-die. Each of the upper and lower dies has a profile extending longitudinally along the length of the dies, the profiles of the upper and lower dies being complementary and designed to produce a desired final profile. More particularly, the profiles of the upper and lower dies are such that a sheet of deformable material, generally metal, fed to the assembly is progressively deformed along the longitudinal length of the sheet of material.

Deformation of the sheet of material is achieved by pressing the upper and lower dies together, for example using an eccentric cam (illustrated in FIG. 19 of this document), or using pivoting arms attached to the sides of the upper and lower ales (illustrated in FIG. 28 of this document).

Likewise, European Patent No. 0 384 287 describes an assembly that includes upper and lower dies that are designed to progressively deform a sheet of material fey pressing the dies together using an eccentric cam.

In both instances, the upper and lower dies engage and disengage the sheet material to be deformed along a processing length. As the sheet is engaged, having been displaced horizontally through the upper and lower die set during the disengagement operation, the sheet is progressively deformed to the final profile.

The present invention alms to provide an alternative press forming assembly and method to those described above. The assembly and method of the invention advantageously avoid or alleviate problems associated with unnecessary deformation of the deformable material that may be observed during disengagement of the material during processing. The invention also aims to provide a method of fabricating a die set suitable for use in such an assembly and method.

SUMMARY OF THE INVENTION

According to one aspect of the invention there is provided an assembly for press forming a deformable material including:
  a first die array including a plurality of dies, the first, die array defining a first die profile;
  a second die array that is complementary with the first die array and including a plurality of cites, the second die array defining a second die profile that is complementary with the first die profile; and
  a drive for driving at least one of the first die array and the second die array;
  wherein in use the plurality of dies of the first die array and the plurality of dies of the second die array sequentially engage the deformable material along a processing length to deform the deformable material to a predetermined profile.

As used herein, sequential engagement of the deformable material indicates that the deformable material is engaged by dies of the first die array and the second die array in sequence so as to avoid or at least alleviate unnecessary deformation of the deformable material. The dies of the first die array and the second die array do not simultaneously engage and disengage the deformable material along the entire processing length of the deformable material Sequential engagement should not be inferred as meaning ordered engagement and may include random engagement.

In order to achieve sequential engagement of the deformable material along the processing length, the first die array advantageously includes a preliminary set of dies and a secondary set of dies, the preliminary set of dies and secondary set of dies sequentially engaging the sheet of deformable material along the processing-length in use. It will be appreciated, however, that the invention is not so limited. For example, the first die array may include tertiary and quaternary sets of dies, and so on, if desired.

Taking the example of art array including a preliminary set of dies and a secondary set of dies, in one embodiment the preliminary set of dies includes odd numbered dies within the first die array and the secondary set of dies includes even numbered dies within the first die array. In that case, the odd numbered dies and even numbered dies of the first die array are advantageously separately driven by the drive. It will be appreciated that any combination of dies may be employed to form the preliminary set of dies and the secondary set of dies. This may be dependent on the predetermined profile that is desired after forming of the deformable material.

The dies of the preliminary die set, and likewise those of the secondary die set, may be associated with one another by any suitable means. In one embodiment, the odd numbered dies of the first die array are associated with a first drive plate and the even numbered dies of the first die array are associated with a second drive plate, each of the first drive plate and second drive plate being driven by the drive. In a particular embodiment, the first drive plate is defined by a pair of longitudinal plates extending along transverse edges of the first die array, and the second drive plate is defined by a longitudinally extending central plate that is longitudinally straddled by the pair of longitudinal plates defining the first drive plate.

In certain embodiments, it is preferred that the first die array and the second die array each include a preliminary set of dies and a secondary set of dies, the preliminary set of dies and secondary set of dies of the first die array and the second die array sequentially engaging the deformable material along the processing length in use. In that ease, the preliminary set of dies of the first die array and the second die array may again include odd numbered dies within the first die array and the second die array respectively, and the secondary set of dies of the first die array and the second die array may include even numbered dies within the first die array and the second die array respectively.

As was the case in accordance with the earlier described embodiment, the odd numbered dies and even numbered dies of the first die array and, now also, the second die array may be separately and respectively driven by the drive.

Once again, the various die sets may be associated with one another as desired by any suitable, means. In one embodiment, the odd numbered dies of the first die array are associated with a first drive plate and the even numbered dies of the first die array are associated with a second die plate, and the odd numbered dies of the second die array are associated with a third drive plate and the even numbered dies of the second die array are associated with a fourth drive plate, each of the drive plates being driven by the drive. The various die plates may take a similar form to that described above.

It will be appreciated that in order to effect sequential engagement of the deformable material with the dies of the first and second die arrays, some form of reciprocating motion of the dies will be required. According to one embodiment, the dies of the first die array and the second die array are driven in linear reciprocating motion. The linear motion may, for example, be within the planes of the individual dies of the die arrays. Alternatively, the linear motion may toe at an inclined or declined angle to the planes of the individual dies. Still further, according to other embodiments, the reciprocating motion may be an orbital or elliptical reciprocating motion. Preferably, the reciprocating motion of the odd numbered dies of the first die array and the second die array is offset relative to the reciprocating motion of the even numbered dies of the first die array and the second die array. Such an arrangement advantageously facilitates drawing of the deformable material through the assembly.

The orientation of the first die array and the second die array is not particularly limited. For example, the two arrays may be disposed in vertical planes.

However, for convenience, the first die array and the second die array are referably disposed in horizontal planes.

In some instances, particularly when forming more complex profiles, if may be desirable to include additional die arrays to effect further forming of the deformable material. For example, in one embodiment, the assembly includes:
  a third die array including a plurality of dies, the third die array defining a third die profile;
  a fourth die array that is complementary with the third die array and including a plurality of dies, the fourth die array defining a fourth die profile that is complementary with the third die profile; and
  a drive for driving at least one of the third die array and the fourth die array;
  wherein, in use, the plurality of dies of the third die array and the plurality of dies of the fourth die array sequentially engage the deformable material, preformed by the first die array and the second die array, along a processing length to deform the deformable material to a final profile.

When the first die array and second die array are disposed in generally horizontal planes, the third die array and the fourth die array will generally be disposed in a plane that is offset, or at an angle to, the horizontal plane. In some instances, the third die array and the fourth die array are disposed in vertical planes. This advantageously enables forming of a wider variety of profiles from the deformable material.

In some instances, it may be difficult to feed the deformable material into the assembly. As such, in a preferred embodiment the assembly includes a guide for guiding the deformable material between the first die array and the second die array.

The drive of the assembly is not particularly limited and variations would be readily appreciated by those of skill in the art. For example, the drive may be a mechanical or hydraulic drive. In certain embodiments, the drive includes a mechanical drive with gearing.

The above description relates to an assembly including at least one pair of die arrays that cooperate with one another and complement one another, and that may be useful in forming a deformable material to a desired profile. It is also envisaged that in some instances, for example when forming less complex profiles, it may fee possible to effectively produce a desired result with only one die array matched with a complementary solid die.

As such, according to an alternative embodiment of the invention there is provided an assembly for press forming a deformable material including:
- a first die defined by a die array including a plurality of dies, the die array defining a first die profile;
- a second die that is complementary with the first die; and
- a drive for driving at least the die array of the first die;
- wherein in use the plurality of dies of the first die array sequentially engage the deformable material along a processing length to deform the deformable material to a predetermined profile.

According to this aspect, the second die may be a solid die. In that regard, the second die may define a second die profile that is complementary with the first die profile. In that case, the second die may be formed of the same material, or a similar material to the first die. Alternatively, the second die may be formed of a resilient flexible material that deforms to a complementary profile to the first die profile on engagement with the die array of the first die. For example, it is envisaged that suitable resilient flexible materials may include a hard rubber material or a relatively stiff deformable plastic material.

It will be appreciated that the embodiments and features as described above in relation to the previous aspect of the invention will likewise be applicable to this aspect of the invention. As such, for convenience, reference is made thereto without repeating each and every feature in respect of tills aspect of the invention.

The inventors have identified various advantages that may be provided by forming a deformable material to a desired profile using arrays of dies, as will be described in more detail below. Accordingly, the present invention also provides a die set for use in an assembly as described above, the die set including:
- a first else array including a plurality of dies, the first die array defining a first die profile; and
- a second die array that is complementary with the first die array and including a plurality of dies, the second die array defining a second die profile that is complementary with the first die profile.

As will be gleaned from the above description of the assembly of the invention, in certain embodiments the first die array and the second die array each include a preliminary set of dies and a secondary set of dies, the preliminary set of dies and secondary set of dies of the first die array being separately mounted and the preliminary set of dies and the secondary set of dies of the second die array being separately mounted.

Again, the preliminary set of dies of the first die array and the second die array may include odd numbered dies within the first die array and the second die array respectively, and the secondary set of dies of the first die array and the second die array may include even numbered dies within the first die array and the second die array respectively.

Likewise, as previously described, the odd numbered dies of the first die array may be associated with a first drive plate and the even numbered dies of the first die array may be associated with a second die plate, and the odd numbered dies of the second die array may be associated with a third drive plate and the even numbered dies of the second die array may be associated with a fourth drive plate.

According to an alternative aspect of the invention there is provided a die set for use in an assembly as described above, the die set including:
- a first die defined by a die array including a plurality of dies, the first die array defining a first die profile; and
- a second die that is complementary with the first die.

As was the case above, the second die may be a solid die and may define a second die profile that is complementary with the first die profile or may foe formed of a resilient flexible material that deforms to a complementary profile to the first die profile on engagement with the die array of the first die.

According to another aspect of the invention there is provided an assembly for press forming a deformable material including:
- a first die array including a plurality of dies, the first die array defining a first die profile;
- a second die array that is complementary with the first die array and including a plurality of dies, the second die array defining a second die profile that is complementary with the first die profile:
- said first die array or said second die array including either at least a preliminary set of dies and/or a secondary set of dies; and
- a drive system including a first reciprocally operating drive element to reciprocally move said preliminary set of dies and a second reciprocity drive element to reciprocally move said secondary set of dies and phase control means to control the phase of the respective movement of the first and second drive elements;
- wherein in use the plurality of dies of the first die array and the plurality of dies of the second die array sequentially engage the deformable material along a processing length to deform the deformable material to a predetermined profile.

The first die array advantageously includes the preliminary set of dies and the secondary set of dies, the preliminary set of dies and secondary set of dies sequentially engaging the sheet of deformable material along the processing length in use. It will be appreciated however, that the invention is not so limited. For example, the first die array may include tertiary and quaternary sets of dies, and so on, if desired.

In another example of the invention an array can include a preliminary set of dies, a secondary set of dies and a tertiary set of dies. In this case each set can respectively be made up of every third die in the die array. Each of the sets of dies is advantageously separately driven. This can be achieved by the drive system including a third reciprocally operating drive element and the phase control means controlling the phase of the respective movement of the first second and third drive elements. It will be appreciated that any number of sets of dies can he used with corresponding drive elements all with the respective phase of reciprocating movement controlled.

Again, in certain embodiments, it is preferred that the first die array and the second die array each include a preliminary set of dies and a secondary set of dies, the preliminary set of dies and secondary mi of dies of the first die army and the second die array sequentially engaging the deformable material along the processing length in use. In that case, the preliminary set of dies of the first die array and the second die array may again include odd numbered dies within the first die array and the second die array respectively, and the secondary set of dies of the first die array and the second die array may include even numbered dies within the first die array and the second die array respectively. Equally each array can also include a tertiary set of dies with each set being respectively made up of every third die.

The reciprocal movement of the die sets can again be a linear reciprocating motion. The linear motion may, for example, be within the planes of the individual dies of the die arrays. Alternatively, the linear motion may be at an inclined or declined angle to the planes of the individual dies. Still further, the reciprocating motion can be an orbital or elliptical reciprocating motion. Advantageously, the reciprocating movement includes a translational component along the die arrays to facilitate movement of the deformable material through the assembly. This can be achieved by a variety of mechanisms. For example a pair of linear actuators such as hydraulic or pneumatic cylinders can be used to produce the reciprocating movement and the translateral component separately, in other configurations mechanical arrangements including a cam or crank arrangement can be used to provide the reciprocal movement with a translateral component. Phase control between the drive elements can be provided in a variety of ways according to the application and nature of the drive. Fixed phase control can be achieved using a mechanical drive including a number of offset cranks or cams. Computer control can be used with separately driven cranks or cams. This control can vary the phase between the drive elements during the reciprocal cycle to control the speed of movement of the deformable material through the assembly. Advantageously the phase can be varied to impart a substantially constant velocity to the deformable material. Linear actuators can similarly fee controlled to set or vary the phase of the respective reciprocal movements of the driven elements.

The nature of the deformable material is not particularly limited, provided that if may be formed into the desired final profile. For example, the deformable material may be a low gauge sheet of material, or may be a higher gauge plate of material. It will be appreciated that whilst the gauge of material may be selected from a wide range, the assemblies and dies described above may suitably be employed without alteration of their general design. For example, heavier gauge material may simply necessitate the use of a more powerful drive for the assembly or a larger die set, compared with that which may be required for lower gauge sheet material.

Likewise, the deformable material may include any material suitable for deformation into a final desired profile. For example, the deformable material may be a sheet or plate of metal, such as aluminum, brass, copper, cold rolled steel, mild steel, tin, nickel, magnesium, titanium and so on. Alternatively, the deformable material may be a sheet of thermoplastic material which may optionally be fibre-reinforced. Suitable thermoplastic, materials will be readily appreciated by those in the art. For example, these may include polyethylene, polypropylene, polycarbonate, polyethylene terepthalate, polyacrylate, polymethacrylate and so on.

If the deformable material is less malleable at room temperature, it may be desirable to heat the deformable material prior to and/or during the deformation process. As such, in certain embodiments the assembly includes a heater for preheating the deformable material. Likewise, in certain embodiments the dies of the assembly may be heated to impart heat to the deformable material during deformation.

As mentioned above, the invention not only relates to an assembly for press forming a deformable material, but also to die sets for use in such assemblies. These die sets may be designed as needed for a particular desired final profile. During development of the invention, an advantageous method of fabricating such die sets has also been developed.

Accordingly, in a further aspect the invention provides a method of fabricating a die set having a profile for continuous deformation of a deformable material from an initial profile to a final profile including:

mapping the profile of the die set;
forming the die set, including a first die and a second die that define the profile of the die set; and
splitting at least one of the first die and the second die to form a die array.

Mapping of the profile of the die set may be achieved by any suitable means. Generally, mapping will be achieved using differential geometry taking into account the path from the initial profile to the final profile. Particularly, computer based mapping may be suitably employed in accordance with this aspect of the invention.

Mapping is preferably conducted such that each portion of the deformable material passes the same distance through the die set during the deformation process. This may advantageously avoid issues associated with excessive stretching of the deformable material, for example damage to surface treatments that may be applied to the material.

It is also preferred that the mapping be carried out such that redundant deformation is minimized, or such that the length of the profile of the die set is minimized.

Forming of the die set, including first and second dies that define the profile of the die set, may be achieved by any suitable method known in the art. In a particular embodiment, the die set is formed by casting of a suitable material. Alternatively, the die set may be machined.

Similarly, splitting of at least one of the first die and the second die may be achieved by any suitable means. For example, this may be achieved using an electrode wire cutter (i.e. spark cutting), or other suitable cutting apparatus.

According to another aspect of the invention there is provided a method for press forming a deformable material including feeding the deformable material between a first die array including a plurality of dies and a second die array including a plurality of dies, wherein the plurality of dies of the first die array and the plurality of dies of the second die array sequentially engage the deformable material along a processing length to deform the deformable material to a predetermined profile.

As previously noted, sequential engagement may be achieved by any suitable means. In one embodiment, the plurality of dies of the first die array and the plurality of dies of the second die array sequentially engage the deformable material in an offset reciprocating motion along the processing length of the deformable material. For example, the reciprocating motion of odd numbered dies of the first die array and the second die array may be offset relative to the reciprocating motion of even numbered dies of the first die array and the second die array to facilitate sequential engagement of the deformable material along the processing length.

In some instances, it may be desirable to work the deformable material after it is deformed to the predetermined profile. As such, in certain embodiments the method may include post working of the deformable material after it is press formed to the predetermined profile. For example, post working may include, roll forming, straightening and/or welding of the deformable material. Other alternatives for post working would be readily appreciated by those of skill in the art.

According to an alternative aspect of the invention there is provided a method for press forming a deformable material including feeding the deformable material between a first die defined by a die array including a plurality of dies and a second die, wherein the plurality of dies of the first die array sequentially engage the deformable material along a processing length to deform the deformable material to a predetermined profile.

As noted above, in some instances it may be desirable to preheat the deformable material before it is subjected to the deformation process, or to apply heat to the deformable material during the deformation process. As such, the method may include heating the deformable material to a predetermined temperature prior to and/or during deformation of the deformable material.

DETAILED DESCRIPTION OF THE INVENTION

The present invention will now be described in more detail with reference to the accompanying drawings. It should be realised that the following detailed description is provided for exemplification only and should not be construed as limiting on the invention in anyway. In the drawings:

FIG. 1 illustrates some simple profiles of formed sheet-material;

FIGS. 2A to 2C illustrate a conventional roll forming assembly;

FIGS. 3A to 3D illustrate defects associated with conventional roll forming processes;

Figure 4:
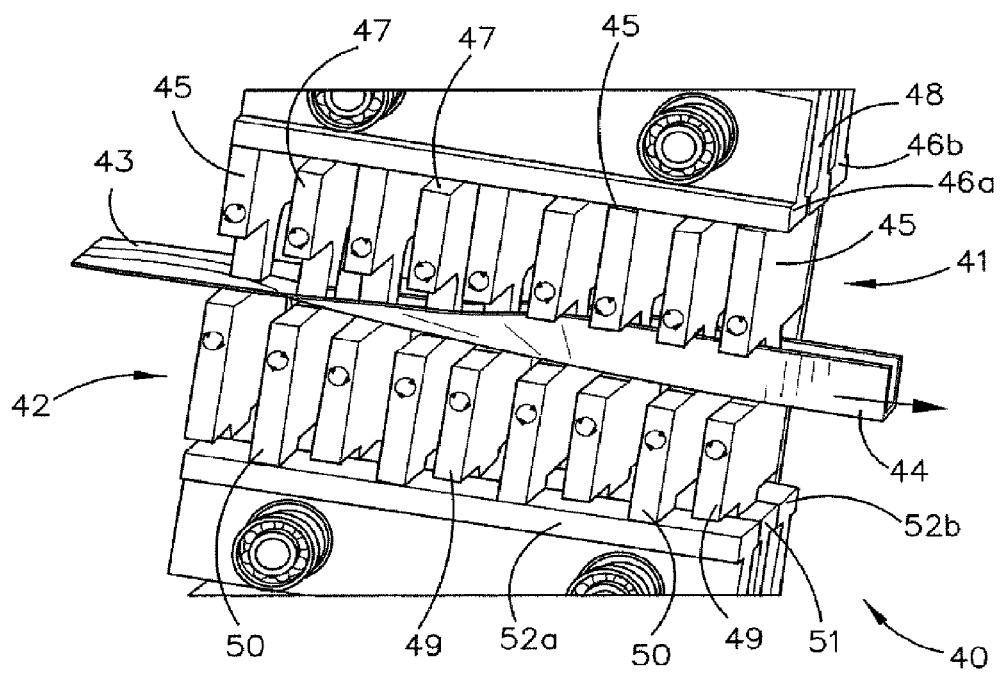
FIG. 4 illustrates a press forming assembly according to an embodiment of the invention.
Figure 5:
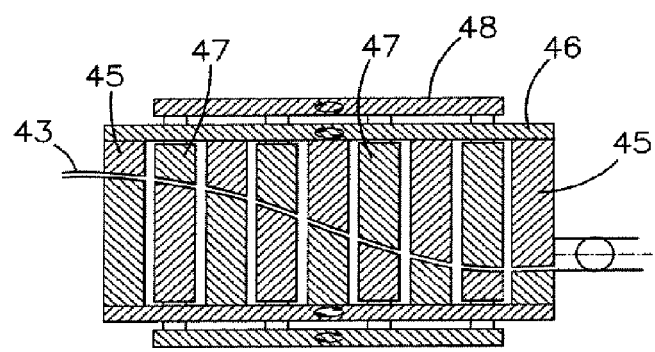
FIG. 5 illustrates a sectional side view of a press forming assembly according to an embodiment of the invention.
Figure 10:
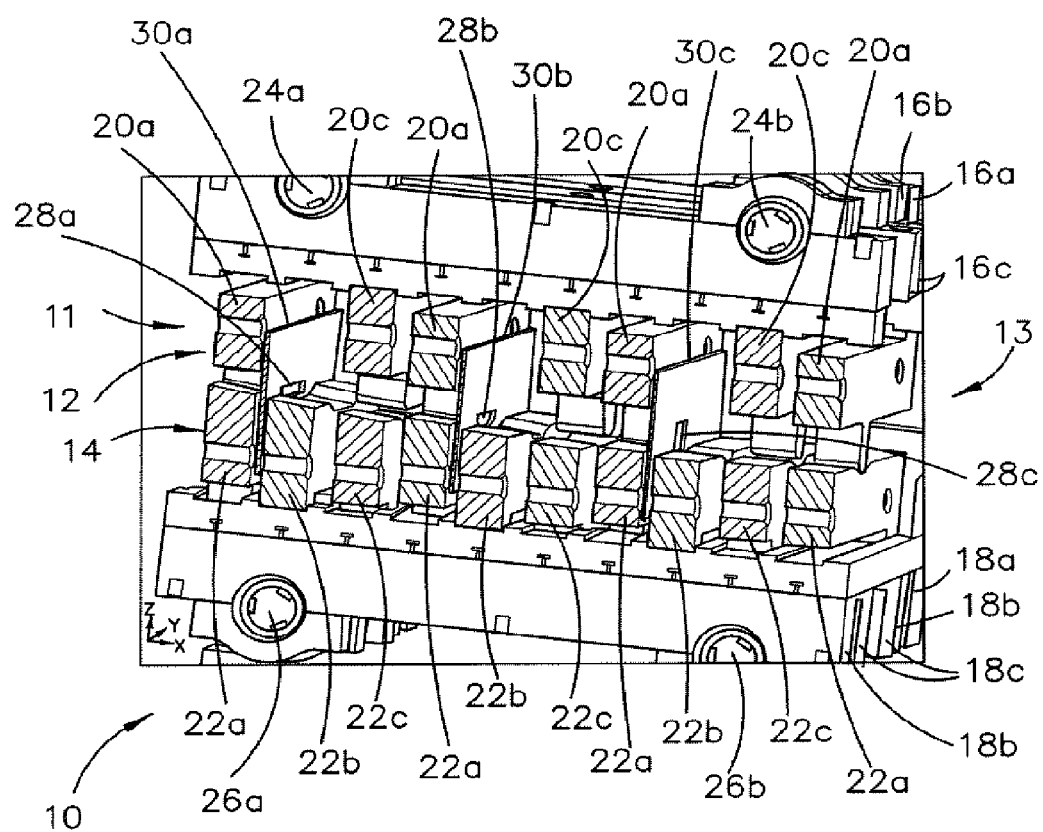
FIG. 10 is a sectional view of a press forming assembly according to a further embodiment of the invention.
Figure 13:
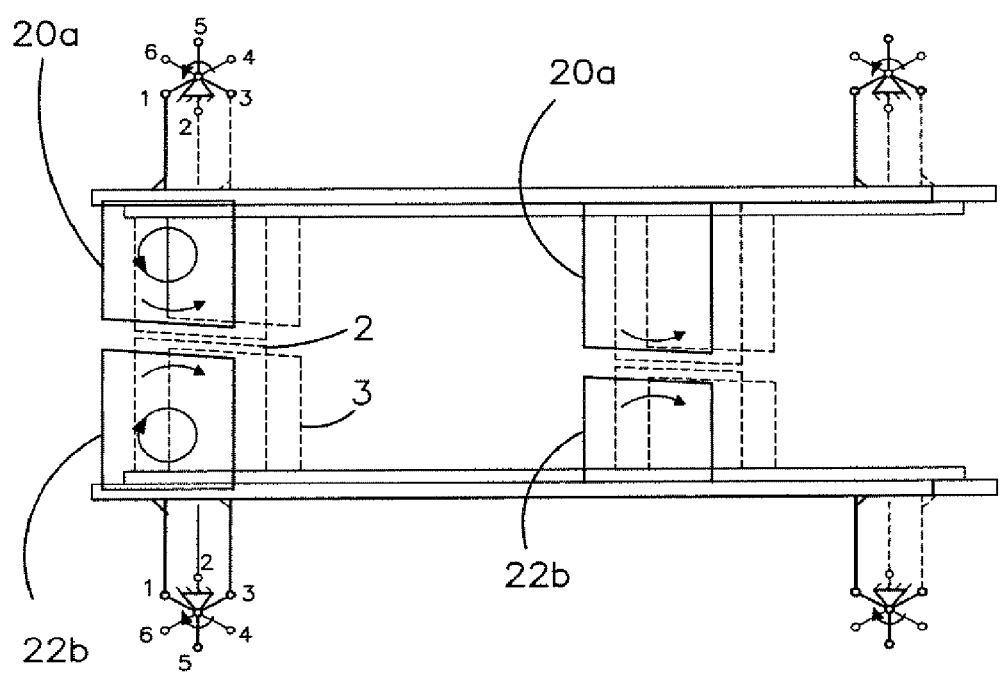

FIG. 13 is a schematic illustration of the operation of the assembly of FIG. 10, Referring to FIG. 4, a press forming assembly 40 is illustrated that includes an upper die array 41 and a lower die array 42. A sheet of deformable material 43, which will be referred to hereafter as a sheet of metal for convenience, is fed between the upper die array 41 and the lower die array 42 and is progressively deformed to a desired final profile 44.

The upper and lower die arrays 41 and 42 each include a plurality of individual dies. The upper die array is defined by a preliminary set of dies made up of odd numbered dies 45 in the upper dies array 41. The add number dies 45 are supported by a drive plate defined by two longitudinally extending plates 46a and 46b, The plates 46a and 46b extend longitudinally along the transverse edges of the odd numbered dies 45 and are engaged by a drive to facilitate driven reciprocation of the odd numbered dies 45.

A secondary set of dies made up of even numbered dies 47 in the upper die array 41 is also provided. The even numbered dies 47 are supported by a drive plate 48 that extends longitudinally along the even numbered dies 47 and that is longitudinally straddled by the plates 46a and 46b that support the odd numbered dies 45. Again, the drive plate 48 is engaged by a drive to facilitate driven reciprocation of the even numbered dies 47.

In a similar fashion, the lower die array 42 includes a primary set of dies made up of odd numbered dies 49 and a secondary set of dies made up of even numbered dies 50. As illustrated in FIG. 4, the odd numbered dies 49 are associated with, and supported by, a drive plate 51, while the even numbered dies 50 are supported by a drive plate defined by longitudinally extending plates 52a and 52b.

Figure 6:
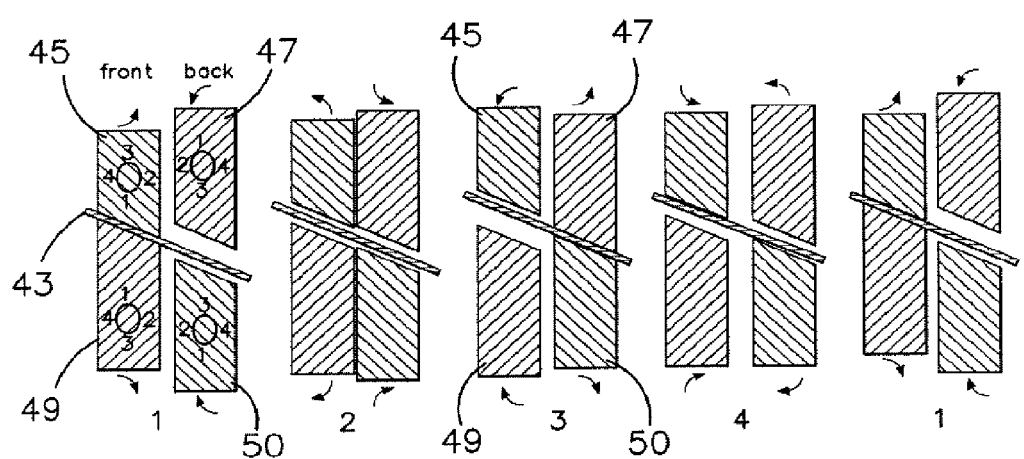
FIG. 6 illustrates an example of the progressive sequential engagement of dies of a press forming assembly according to embodiments of the invention.

Referring to FIG. 6, the reciprocal motion of a pair of odd numbered dies 45 and 49 and a pair of even numbered dies 47 and 50 is illustrated. The die pairs 45, 49 and 47, 50 are driven such that they operate in an offset reciprocating motion. More particularly, the die pairs 45, 49 and 47, 50 sequentially engage the metal sheet 43 passing through the upper and lower die sets. This advantageously facilitates progressive deformation of the metal sheet 43 while minimising unnecessary deformation clue to disengagement of the die arrays with the sheet 43.

Referring to the first frame of the series of frames illustrated in FIG. 6, it will be appreciated that dies 45 and 49 are in engagement with the sheet of metal 43 as it enters the assembly, while dies 47 and 50 are disengaged from the sheet of metal 43. In a second frame, the dies are all disengaged from the sheet 43. If will be appreciated that in this instance, dies located further along the die arrays of the assembly will be engaged with the sheet 43. The offset reciprocating motion of the dies is evidenced by the illustration in the third frame of FIG. 6. In that frame, the dies 45 and 49 that ware previously engaged with the sheet of metal 43 have totally disengaged the sheet of metal 43, while the dies 47 and 50 that were previously disengaged from the sheet of metal 43, have now engaged the sheet of metal 43. This movement of the dies within the upper and lower die arrays advantageously aids in feeding or drawing the sheet of metal 43 through the assembly.

Figure 7:
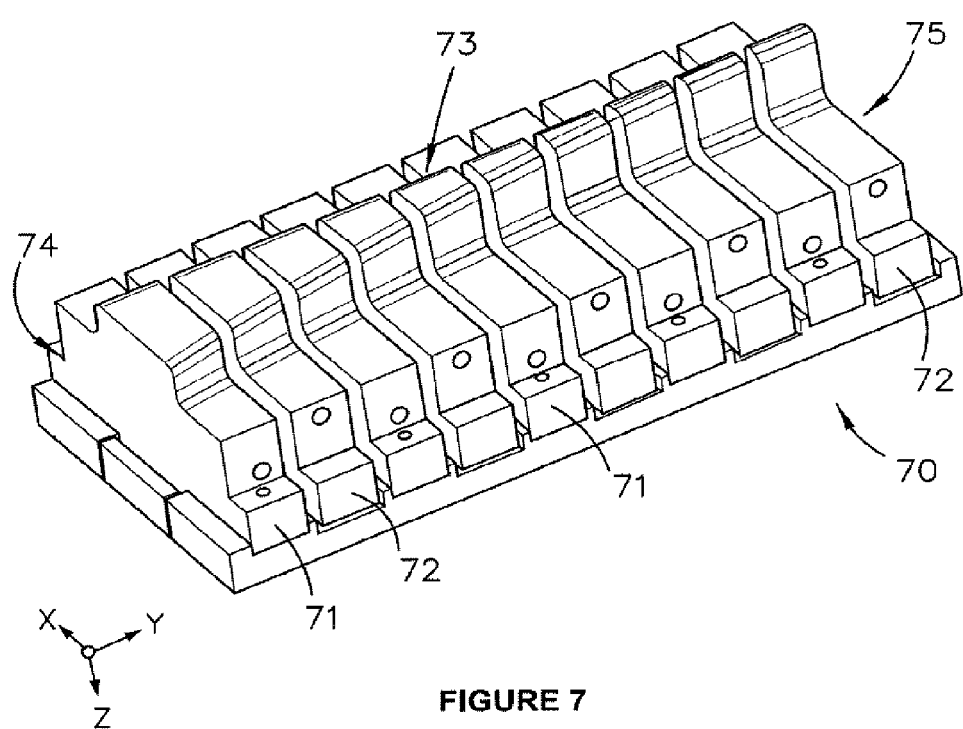
FIG. 7 illustrates a die array according to one embodiment of the invention.
Figure 8:
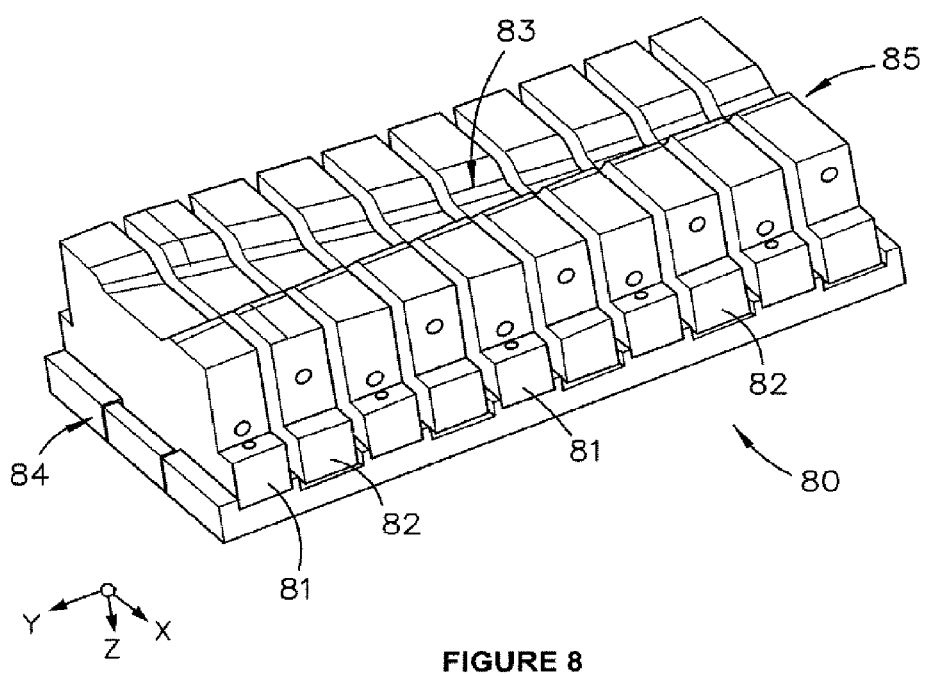
FIG. 8 illustrates a die array that is complementary to the die array of FIG. 7.
Figure 9:
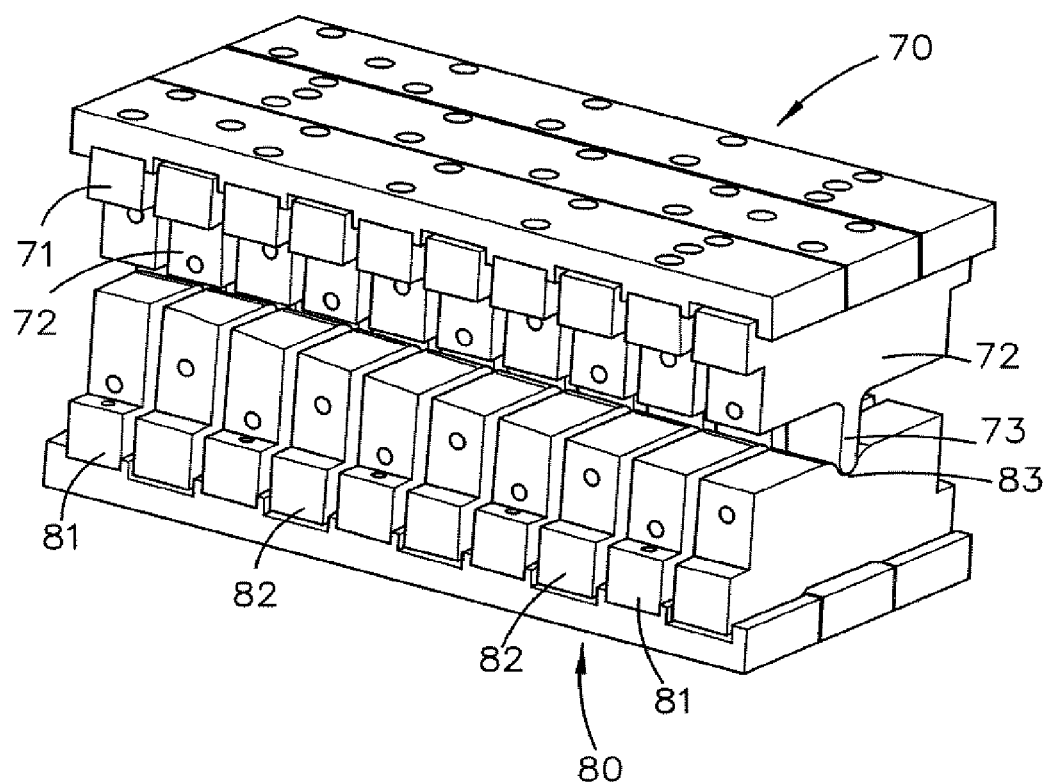
FIG. 9 illustrates the die arrays of FIGS. 7 and 8 in combination.

Referring to FIGS. 7 through 9, an embodiment of the upper die array 70 and lower die array 80 and their positioning together are illustrated in more detail, it will, however, be appreciated that this is only one of many embodiments that may be employed, depending on the desired final profile for the sheet of metal.

The upper die array 70 includes a preliminary die set made up of odd numbered dies 71, and a secondary die set made up of even numbered dies 72. The dies 71 and 72 define a die profile 73 along the longitudinal, or processing, length of the upper die array 70. The die profile 73 has a relatively low profile at a feed end 74, and a relatively high profile at an exit end 75. As such, a sheet of metal is progressively deformed along the processing length of the upper die array 70.

In a similar fashion to the upper die array 70, the lower die array 80 includes a preliminary die set made up of odd numbered dies 81, and a secondary die set made up of even numbered dies 82. Again, the dies 81 and 82 define a die profile 83 along the longitudinal, or processing, length of the lower die array 80. The die profile 83 again has a relatively low profile at a feed end 84, and a relatively high profile at an exit end 85. As such, the die profiles 73 and 83 are complementary with one another.

A better appreciation of the complementary nature of the profile 73 of the upper die array 70 and the profile 83 of the lower die array 80 can be gained through FIG. 9. In this illustration it may be seen that the profiles 73 and 83 are complementary along the processing length of the die arrays 70 and 80. The profiles 73 and 83 are such that the sheet of metal being passed between the die arrays 70 and 80 is progressively deformed to the desired final profile. Moreover, the sequential engagement of the sheet of metal to be formed by the individual dies 71, 72, 81 and 82 of the upper die array 70 and lower die array 80 alleviate or eliminate spring back of the sheet of metal, during forming. This is generally due to the fact that at least one or more dies is in engagement with the sheet of metal at any one time during-forming. The assembly also advantageously reduces or eliminates axial stretching and bending of the sheet of metal during forming.

Referring to FIG. 10, a press forming assembly 10 is illustrated which includes an upper die array 12 and a lower die array 14. A sheet of deformable material (not shown) is fed between the upper die array 12 and the lower die array 14, entering the press forming assembly 10 through entry 11 and exiting the press forming assembly 10 via exit 13. The deformable material is generally fed into the press forming assembly as a flat sheet and progressively formed to a desirable profile.

The upper and lower die arrays 12 and 14 each include a plurality of individual dies. Upper and lower dies arrays 12 and 14 each comprise at least a preliminary set of dies and a secondary set of dies. In the embodiment shown a tertiary set of dies is also included, however it will be appreciated that the tertiary die sets are not essential and also that further die sets could be used. For each individual upper die, a correspondingly shaped lower die is provided.

Each set of dies is fixedly attached to a drive plate extending longitudinally through press forming assembly 10. Preliminary upper die set 20a is fixedly attached to a preliminary upper drive plats 16a, secondary upper die set 20b (not shown) is fixedly attached to a secondary upper drive plate 16b and tertiary upper die set 20c is fixedly attached to a tertiary upper drive place 16c. Accordingly, upper drive plates 16a, 16b, 16c are configured to drive corresponding upper die sets 20a, 20b, 20c respectively.

Figure 11:
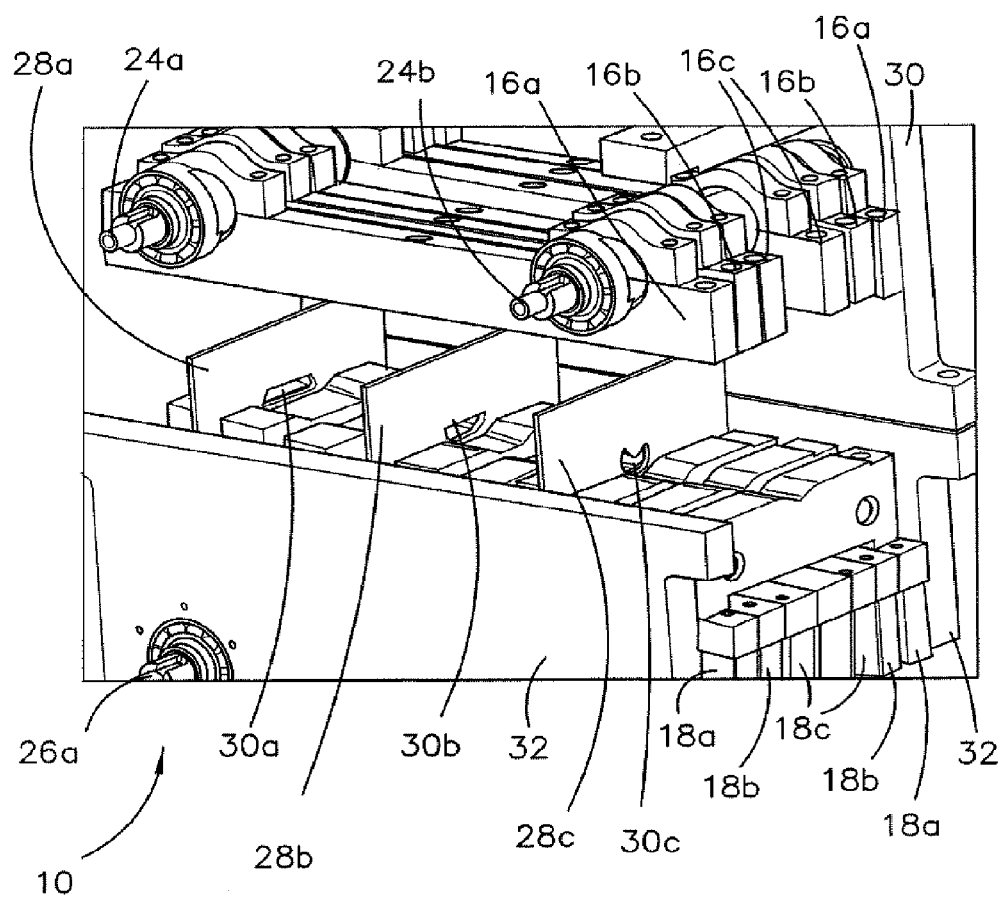
FIG. 11 is a further view of the assembly of FIG. 10 with components removed for clarity.

Referring to FIGS. 10 and 11, secondary upper die sot 20b dies been removed to allow guide plates 30a, 30b, 30c to be seen clearly. Secondary upper die set 20b is positioned between preliminary upper die set 20a and tertiary upper die set 20c.

Preliminary lower die set 22a is fixedly attached to a preliminary lower drive plate 18a, secondary lower die set 22b is fixedly attached to a secondary lower drive plate 18b and tertiary lower die set 22c is fixedly attached to a tertiary lower drive plate 18c. Accordingly, lower drive plates 18a, 18b, 18c are configured to drive corresponding lower dies 22a, 22b, 22c respectively, in a manner that is generally synchronised with corresponding upper dies 20a, 20b, 20c.

It should be noted that in the embodiment depicted, preliminary upper die set 20a engages with preliminary lower die set 22a, secondary upper die set 20b engages with secondary lower die set 22a and tertiary upper die set 20c engages with tertiary lower die set 22c

The reciprocating motion of upper drive plates 16a, 16b, 16c and corresponding lower drive plate 18a, 18b, 18c comprises both reciprocating and translating components. This may include any combination of reciprocating and translating motion, for example, any one of upper drive plates 16a, 16b, 16c or lower drive plates 18a, 18b, 18c may travel in a circular, elliptical, square, triangular or any other regular or irregular shaped path.

In use upper dies 20a, 20b, 20c are urged downwards to press the deformable material against lower dies 22a, 22b, 22c and then across to advance the deformable material through press forming assembly 10 toward exit 13.

As previously discussed, preliminary upper drive plate 16a is configured to be driven in a manner that is synchronised with preliminary lower drive plate 18a, however, secondary upper drive plate 16b, which is configured to be driven in sync with secondary lower drive plate 18b, is driven out of phase with preliminary upper and lower drive plates 16a and 18a. Also, tertiary upper drive plate 16c, which is configured to be driven in a manner that is synchronised with tertiary lower drive plate 18c, is out of phase from both preliminary upper and lower drive plates 16a, 18a and secondary upper and lower drive plates 16b, 18b.

Upper drive plates 16a, 16b 16c and lower drive plates 18a, 18b and 18c may comprise either single or multiple drive plates as can be seen in FIGS. 10 and 11.

The motion of preliminary upper die 20a is synchronised with that of preliminary lower die 22a. the motion of secondary upper die 20b is synchronised with that of secondary lower die 22b and the motion of tertiary upper die 20c is synchronised with that of tertiary lower die 22c. Each of these three pairs of dies move out of phase with the other pairs. The phase of the reciprocating movement is set by the orientation of eccentric portions of a drive shaft as described below.

In use, preliminary upper die 20a will travel generally downward to press the deformable material against upwardly moving preliminary lower die 22a, clamping the deformable material between them and causing if to take the shape of the cavity formed between the preliminary upper die 20a and preliminary tower die 22a. Preliminary upper die 20a and preliminary lower die 22a will then move sidewards in a synchronised manner, thereby advancing the deformable material toward exit 13. Preliminary upper die 20a will then retract upwardly whilst preliminary lower die 22a, moving in a manner generally synchronised with preliminary upper die 20a, will retract downwards, thereby releasing the deformable material.

Secondary upper die 20b will then travel generally downward to press the deformable material against secondary lower die 22b, clamping a portion of the deformable material between them and causing it to take the shape of the cavity formed between secondary upper die 20b and secondary lower die 22b. Because the deformable material is progressively formed, the size of the cavity formed between second upper die 20b and secondary lower die 22b will be different to that between preliminary upper die 20a and preliminary lower die 22a. Secondary upper die 20b and secondary lower die 22b will then move sidewards in a synchronised manner, thereby advancing the deformable material toward exit 13. Secondary upper die 20b will then refract upwardly whilst secondary lower die 22b, moving in a manner generally synchronised with secondary upper die 20b, will retract downwards, thereby releasing the deformable material.

Tertiary upper die 20c will then travel generally downward to press the deformable material against tertiary lower die 22c, clamping a portion of the deformable material between them and causing it to take the shape of the cavity formed between tertiary upper die 20c and tertiary lower die 22c, Because the deformable material is progressively formed, the size of the cavity formed between tertiary upper die 20c and tertiary lower die 22c will be different to that between secondary upper die 20b and secondary lower die 22c. Tertiary upper die 20c and tertiary lower die 22c will then move sidewards in a synchronised manner, thereby advancing the deformable material toward exit 13. Tertiary upper die 20c will then retract upwardly whilst tertiary lower die 22c, moving in a manner generally synchronised with tertiary upper die 20c, will retract downwards, thereby releasing the deformable material.

Referring now to FIG. 13, a schematic diagram showing the movement of preliminary upper die 20a and corresponding preliminary lower die 22a can be seen. At starting position 1, the clearance between preliminary upper die 20a and preliminary lower die 22a allows deformable material to advance between the dies, Moving from position 1 to position 2, preliminary upper die 20a and preliminary lower die 22a travel in a manner including a generally reciprocating component combined with a translational component. Preliminary upper die 20a and preliminary lower die 22a come together to clamp the deformable material and cause it to take the shape of the cavity formed between the preliminary upper die 20a and preliminary lower die 22b. Moving from position 2 to position 3, preliminary upper die 20a and preliminary lower die 22b move sideways advancing the deformable material through the press forming assembly 10 toward exit 13, and also move apart allowing the deformable material to be released.

From position 3, preliminary upper die 20a and preliminary lower die 22a move through positions 4 to 6, where preliminary upper die 20a and preliminary lower die 22a have no interaction with the deformable material, returning to position 1 to recommence the cycle.

In the embodiment shown, upper drive plates 16a, 16b, 16c are supported from shafts 24a and 24b and lower drive plates 18a, 18b, 18c are supported by shafts 26a and 26b, Shafts 24a, 24b and 26a, 26b each comprises eccentric portions corresponding to a different drive plate. Accordingly, when shafts 24a, 24b, 26a, 26b are rotated, drive plates 16a, 16b, 16c, 18a, 18b, 18c are translated in a manner that includes a reciprocal component of motion and a translational component of motion. It will be apparent that the phase of the reciprocating movement of each die set is determined by the orientation of the eccentric portions on shafts 24a, 24b, 26a, 26b.

Alternatively shafts 24a, 24b, 26a, 26b may include for example a crankshaft or solid shaft having lobes in an arrangement similar to that of a camshaft.

Figure 12:
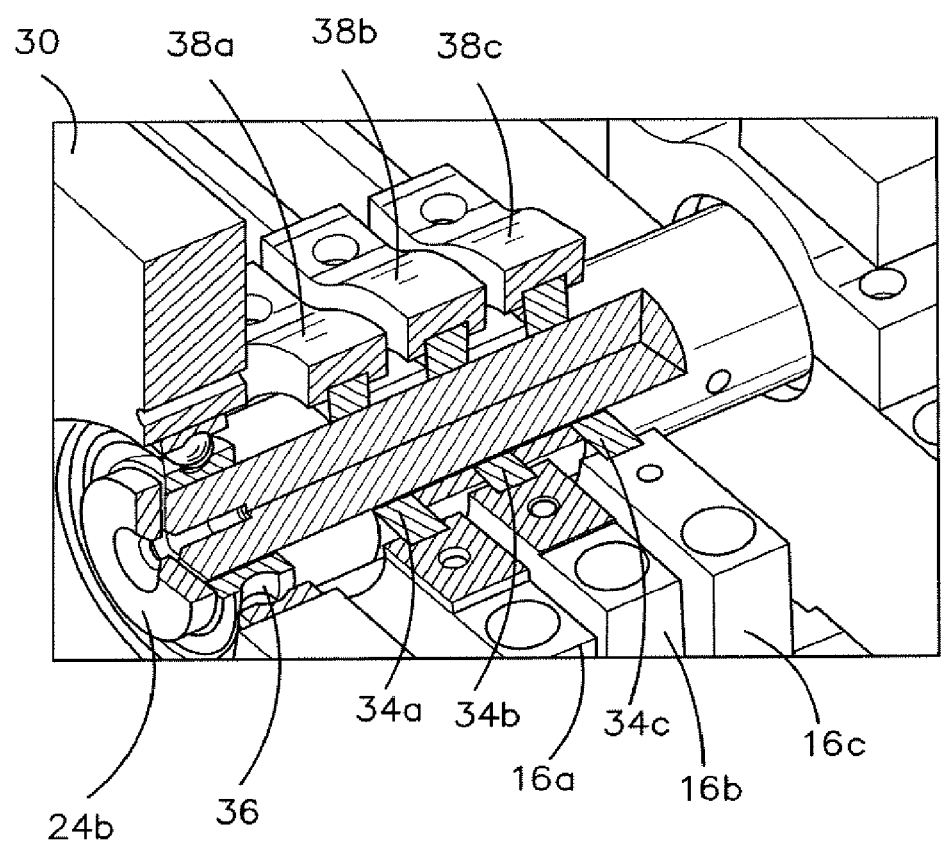
FIG. 12 is a sectional view of part of the assembly of FIG. 10.

Referring to FIGS. 11 and 12, shafts 24a and 24b are supported in front and rear support plates 30 by bearings 36, Shafts 26a and 26b are supported in front and rear plates 32 also by bearings 36. Fixedly attached to shafts 24a and 24b are eccentric elements 34a, 34b, 34c that slidingly engage with housings 38a, 38b, 38c attached to upper drive plates 16a, 16b, 16c respectively. The eccentricity of elements 34a, 34b, 34c cause drive plates 16a, 16b, 16c to translate.

It will be appreciated that lower shafts 26a and 26b will comprise a similar arrangement as to that described for shafts 24a and 24b.

Upper drive plates 16a, 16b, 16c and lower drive plates 18a, 18b, 18c may be driven by other means, for example an arrangement of linear actuators. For example, one linear actuator or multiple actuators may be configured to urge the drive plates in a vertical direction and another actuator or plurality of actuators may be configured to urge the drive plates in a horizontal manner. The resulting motion may be irregular in nature however forming a cycle that includes pressing the deformable material and advancing it to a subsequent stage.

As can be seen in FIGS. 10 and 11, press forming assembly 10 also includes guide plates 28a, 28b, 28c to guide the deformable material through the different processing stages. It can be seen that apertures 30a, 30b, 30c are progressively approaching the desired final shape of the deformable product.

The assembly of the invention has various other advantages, including reduced power consumption due to the decrease in wasted deformation energy. The assembly is smaller in size than its roll forming counterparts. As such, the assembly has a smaller "foot print" which will result in lower production costs. If is anticipated that the assembly of the invention will also provide for lower maintenance costs and operation costs.

It will of course be realised that the above has been given only by way of illustrative example of the invention and that ail such modifications and variations thereto as would be apparent to those of skill in the art are deemed to fall within the broad scope and ambit of the invention as herein set forth.

The invention claimed is:

1. A method of fabricating and assembling a die set having a predetermined profile for continuous deformation of a deformable material along a processing length from an initial profile to a final profile including:
    mapping the predetermined profile of the die set;
    forming the die set, including a first die and a second die that define the predetermined profile of the die set, the second die set being complementary with the first die set;
    splitting the first die to form a first die array, wherein the first die array includes preliminary and secondary sets of dies that are arranged alternately along the processing length; and
    mounting the preliminary set of dies on a first drive plate, and mounting the secondary set of dies on a second drive plate, wherein the preliminary and secondary sets of dies are separately and alternately driven by the respective first and second drive plates along the processing length to provide continuous deformation of the deformable material.

2. A method according to claim 1, wherein the preliminary and secondary sets of dies are mounted on their respective drive plates in a manner such that the preliminary and secondary sets of dies can be driven in a reciprocating motion that includes a translational component, and such that the motion of the preliminary set of dies is offset relative to the motion of the secondary set of dies.

3. A method according to claim 2, wherein the first drive plate is defined by a pair of longitudinal plates, and the second drive plate is defined by a longitudinally extending central plate.

4. A method according to claim 3, wherein the longitudinally extending central plate is longitudinally straddled by the pair of longitudinal plates defining the first drive plate.

5. A method according to claim 4, wherein the pair of longitudinal plates defining the first drive plate extend along the transverse edges of the first die array.

6. A method according to claim 1, further comprising splitting the second die to form a second die array.

7. A method according to claim 6, wherein the second die array includes a preliminary and secondary set of dies, the method further including mounting the preliminary set of dies of the second die array on a third drive plate, and mounting the secondary set of dies of the second die array on a fourth drive plate, such that the preliminary and secondary sets of dies of the second die array are separately driven.

8. A method according to claim 7, wherein the preliminary and secondary sets of dies of the second die array are mounted on their respective drive plates in a manner such that the preliminary and secondary sets of dies of the second die array can be driven in a reciprocating motion that includes a translational component, and such that the motion of the preliminary set of dies of the second die array is offset relative to the motion of the secondary set of dies of the second die array.

9. A method according to claim 8, wherein the first drive plate is defined by a pair of longitudinal plates, and the second drive plate is defined by a longitudinally extending central plate.

10. A method according to claim 9, wherein the longitudinally extending central plate is longitudinally straddled by the pair of longitudinal plates defining the first drive plate.

11. A method according to claim 9, wherein the pair of longitudinal plates defining the first drive plate extend along the transverse edges of the first die array.

* * * * *